United States Patent [19]

Sandrock et al.

[11] 4,249,940
[45] Feb. 10, 1981

[54] MISCHMETAL-NICKEL-IRON HYDROGEN STORAGE COMPOUND

[75] Inventors: Gary D. Sandrock, Ringwood, N.J.; Stephan L. Keresztes, Warwick, N.Y.

[73] Assignee: The International Nickel Co., Inc., New York, N.Y.

[21] Appl. No.: 1,548

[22] Filed: Jan. 8, 1979

[51] Int. Cl.³ ............................................. C22C 19/03
[52] U.S. Cl. .......................................... 75/122; 34/15; 75/134 F; 75/170; 148/32; 423/644
[58] Field of Search .............. 75/170, 122, 134 F; 148/32; 423/644; 34/15

[56] References Cited

U.S. PATENT DOCUMENTS 3,825,418  7/1974  Reilly et al. ........................ 75/170

4,152,145  5/1979  Sandrock ............................ 148/32

OTHER PUBLICATIONS

Van Mal et al., Hydrogen Absorption in LaNi₅ and Related Compounds: Experimental Observations and Their Explanation, Journal of the Less-Common Metals, 35 (1974), pp. 65-76.

*Primary Examiner*—R. Dean
*Attorney, Agent, or Firm*—F. J. Mulligan, Jr; R. J. Kenny

[57] ABSTRACT

Discloses a hydridable compound of the general formula $MNi_{x-y}Fe_y$, where M is mischmetal, x is a number between 4.5 and 5.5 and y is a number between about 0.1 and 1.3.

4 Claims, 2 Drawing Figures

MISCHMETAL-NICKEL-IRON HYDROGEN STORAGE COMPOUND

The present invention is concerned with a hydridable compound (or alloy) and more particularly with a hydridable compound of the mischmetal (M) Ni$_5$ type.

PROBLEM, OBJECTS, DRAWING

It is known that the compound MNi$_5$ forms a very unstable hydride which requires high charging pressures and which shows large absorption/desorption pressure hysteresis. For many purposes, it is desirable to modify this behavior so that more stable hydrides showing less hysteresis are available.

It is an object of the present invention to provide a compound of the MNi$_5$ type which offers advantages over the known characteristics of the MNi$_5$ compound.

Figure 1:
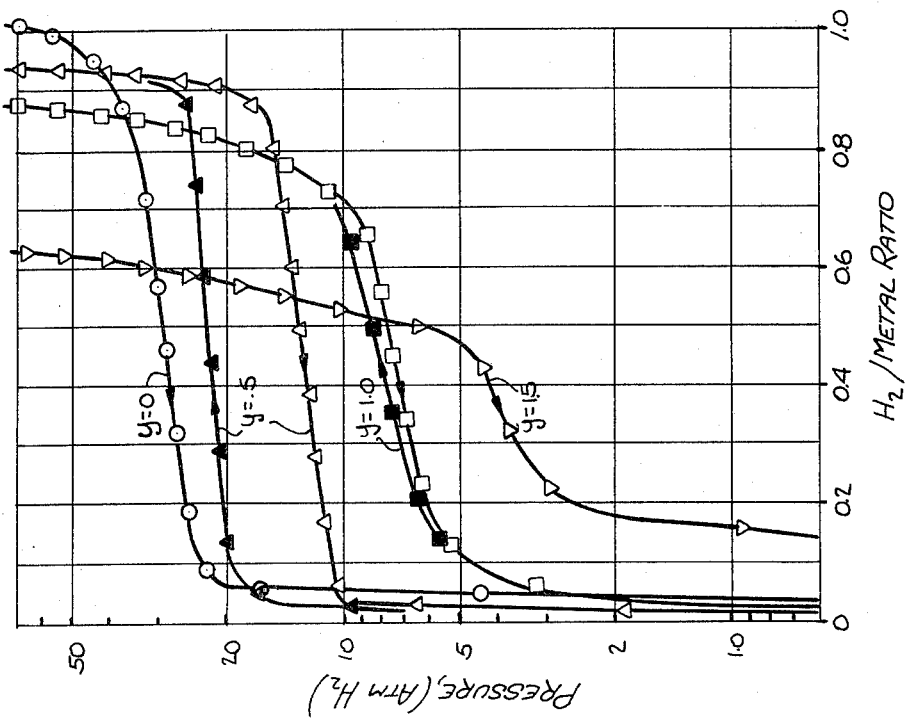

Other objects and advantages will become apparent from the following description taken in conjunction with the drawings in which FIG. 1 is a series of Pressure v Hydrogen/Metal ratio graphical plots of variations of the compounds of the present invention and compound outside the present invention.

Figure 2:
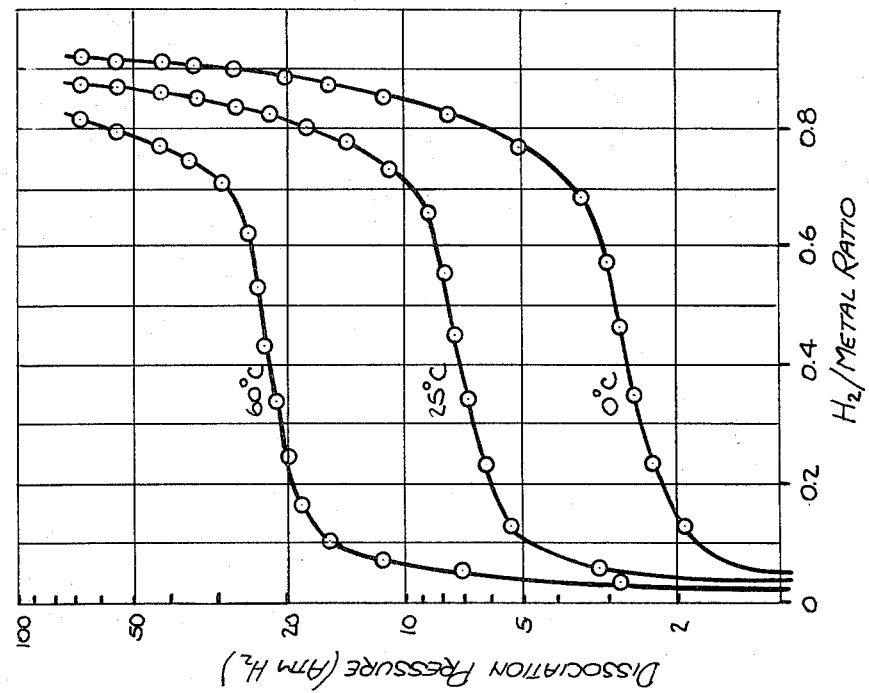

FIG. 2 is a graphical plot showing the effect of temperature on the hydrogen desorption from a compound within the scope of the present invention.

GENERAL DESCRIPTION

The present invention comtemplates a hydridable compound suitable for hydrogen storage and for use in devices wherein hydrogen may be absorbed in and desorbed from a hydridable material comprising essentially a compound of the general formula MNi$_{x-y}$Fe$_y$, where M is mischmetal, x is a number between 4.5 and 5.5 and y is a number between about 0.1 and 1.3. Advantageously, x is about 5.0. Similarly, y is advantageously between about 0.5 and 1.0. Generally, the compound of the present invention is made by melting, casting and crushing alloy made of commercially pure materials. Thus it is comtemplated that the compound of the present invention can and perhaps will contain small amounts of impurities such as cobalt, copper, aluminum, etc., which are not deleterious with respect to the function of the compound.

Compounds of the present invention have been prepared with a mischmetal which contains about 48 to 50% cerium, about 32 to 34% lanthanum, about 13 to 14% neodymium, about 4 to about 5% praseodymium and about 1.5% other rare earths. Of course, as those skilled in the art will recognize, other grades of mischmetals, including an iron-containing mischmetal which is available commercially can be used. Examples of compounds in accordance with the present invention have been made by vacuum melting in an aluminum oxide crucible. Nickel and iron were melted under vacuum and mischmetal was added under a 50 torr argon pressure. After casting, the compounds were crushed to provide 10 to 14 mesh (about 1.5–2.5 mm) material which was then subjected to testing as disclosed under the heading "EXAMPLES".

EXAMPLES

Compounds in accordance with the present invention where x is essentially 5 and y is 0.1, 0.5 or 1.0 and similar compounds where x is 5 and y is either 0 or 1.5 were made. FIG. 1 depicts results of testing at 25° C. and shows that with increasing iron, the hydrogen absorption/desorption plateau pressure of compounds of the family of MNi$_{x-y}$Fe$_y$ decreases. FIG. 1 also shows the substantial absence of hydriding-dehydriding hysteresis coupled with relatively large capacity when iron is at a level of about 1.0 atom per mole of compound. FIG. 2 shows results of testing the compound MNi$_{4.0}$Fe$_{1.0}$ under dissociation (after hydriding) conditions at 0° C., 25° C. and 60° C. FIG. 2 shows the uniformity of capacity of this compound over this temperature range. In compounds of the present invention, iron is effective in lowering the plateau pressure even when it is present in amounts as low as 0.1 atom per mole of compound. The compound MNi$_{4.9}$Fe$_{0.1}$ exhibits a charging plateau pressure which starts (at 25° C.) at about 50 atmospheres which is significantly lower than the initial charging plateau pressure of MNi$_5$. Also the hysteresis between charging and discharging of the compound containing 0.1 atom iron is significantly less than the hysteresis of the iron-free compound.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

We claim:

1. A compound capable of combining with hydrogen to form a hydride consisting essentially of MNi$_{x-y}$Fe$_y$, wherein M is mischmetal, x is a number between about 4.5 and 5.5 and y is a number between about 0.1 and 1.3.

2. A compound as in claim 1, wherein x is about 5.

3. A compound as in claim 1, wherein y is about 0.5 to 1.0.

4. A compound as in claim 2, wherein y is about 0.5 to about 1.0.

* * * * *